(12) United States Patent
Fang et al.

(10) Patent No.: US 7,038,819 B2
(45) Date of Patent: May 2, 2006

(54) DEPTH OF FIELD ADJUSTMENT DEVICE AND METHOD FOR AN AUTOMATIC DOCUMENT FEEDER

(76) Inventors: Po-Hua Fang, 3F, No.55, Aly. 16, Ln. 2, Kuang Fu St., YungHo City, Taipei (TW); Shu-Ya Chiang, No. 21, ShanHsi 7 St., Pei District, TaiChung (TW)

( * ) Notice: Subject to any disclaimer, the term of this patent is extended or adjusted under 35 U.S.C. 154(b) by 535 days.

(21) Appl. No.: 10/012,644

(22) Filed: Nov. 13, 2001

(65) Prior Publication Data

US 2003/0090747 A1    May 15, 2003

(51) Int. Cl.
     *H04N 1/04*      (2006.01)
(52) U.S. Cl. ............... 358/474; 358/498; 358/497; 358/496; 271/186; 271/114; 399/367; 399/405; 399/98
(58) Field of Classification Search ............... 358/474, 358/498, 496, 497, 505; 271/186, 114, 113; 399/405, 98, 367, 177
See application file for complete search history.

(56) References Cited

U.S. PATENT DOCUMENTS

| | | | | |
|---|---|---|---|---|
| 4,335,954 A | * | 6/1982 | Phelps | 399/372 |
| 4,774,591 A | * | 9/1988 | Matsunawa et al. | 358/444 |
| 5,513,017 A | * | 4/1996 | Knodt et al. | 358/471 |
| 5,534,989 A | * | 7/1996 | Rubscha et al. | 399/381 |
| 5,978,622 A | * | 11/1999 | Wenthe, Jr. | 399/98 |
| 6,069,715 A | * | 5/2000 | Wang | 358/498 |
| 6,445,836 B1 | * | 9/2002 | Fujiwara | 382/312 |
| 6,747,763 B1 | * | 6/2004 | Lin | 358/474 |
| 2003/0227654 A1 | * | 12/2003 | Shiraishi | 358/474 |
| 2004/0028425 A1 | * | 2/2004 | Chung | 399/177 |
| 2005/0057842 A1 | * | 3/2005 | Khanna et al. | 360/69 |

* cited by examiner

Primary Examiner—Mark Wallerson
Assistant Examiner—Negussie Worku
(74) Attorney, Agent, or Firm—Berkeley Law & Technology Group LLC (57) ABSTRACT

The present invention relates to a depth of field adjustment device and method for an automatic document feeder. The automatic document feeder has a guiding groove for placing an object to be scanned. The guiding groove has a scanning window for providing image picking-up for an optical chassis. An adjustable suppressing mechanism located at the guiding groove in corresponding to the scanning window may drive the object to be scanned to pass through an optimal depth of field height of the scanning window. First, at least a part of the pre-scanned object is fed in to be located between the adjustable suppressing mechanism and the scanning window. The depth of field height is then adjusted and changed by the adjustable suppressing mechanism. And, the image of the pre-scanned object is compared with a pre-stored image. After the pre-scanned objected has been judged to be located at the optimal depth of field height, the adjustable suppressing mechanism is fixed and the pre-scanned object is sent out. Then, it may achieve a most clear image picking-up for scanning the object to be scanned.

15 Claims, 12 Drawing Sheets

DEPTH OF FIELD ADJUSTMENT DEVICE AND METHOD FOR AN AUTOMATIC DOCUMENT FEEDER

FIELD OF THE INVENTION

The present invention relates to a depth of field adjustment device and method, especially to a kind of depth of field adjustment device and method for an automatic document feeder that can adjust the locating height for the object to be scanned that is placed in the automatic document feeder and passes through the scanning window.

BACKGROUND OF THE INVENTION

High technology is progressing abruptly. Especially the technology for micro-electronic manufacture procedure is further innovated daily, so computer has already penetrated into each family and enterprise to become an indispensable electronic product in our daily lives. Following the prevalence of computer multimedia, more peripheral products are needed for the apparatus of input and output. And, because of the progress of the technology of the optical-electronic semiconductor, the product technology for relative peripheral devices for computer such as scanner, etc. has been more mature and prevalent, and nowadays it has become a necessary product in computer peripheral products.

Wherein, the scanner has further become an important peripheral device for computer for input and output. The scanner mainly applies a light-source module for providing light source incident upon an object to be scanned. And, an optical-length device is applied to receive the reflective image of the object to be scanned that is scanned by the light-source module. Again, a charge-coupled device is applied for picking up the image of the object to be scanned. After the image is converted into digital signals from the optical-electronic signals, they are finally transferred into a computer for proceeding image treatment.

Figure 1A:
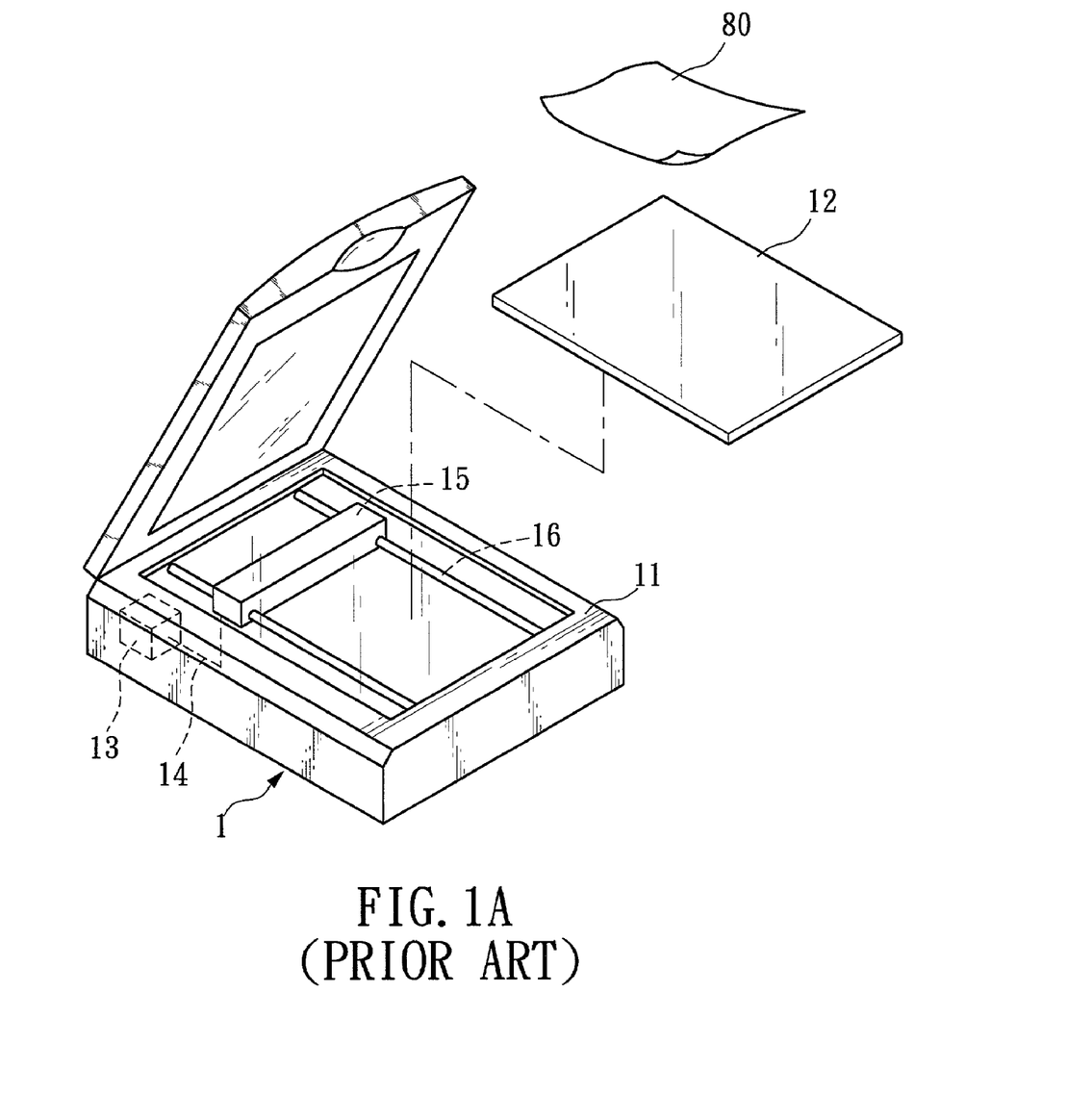
FIG. 1A is a three-dimensional structure illustration for a flatbed-typed scanner of the prior arts.
Figure 1B:
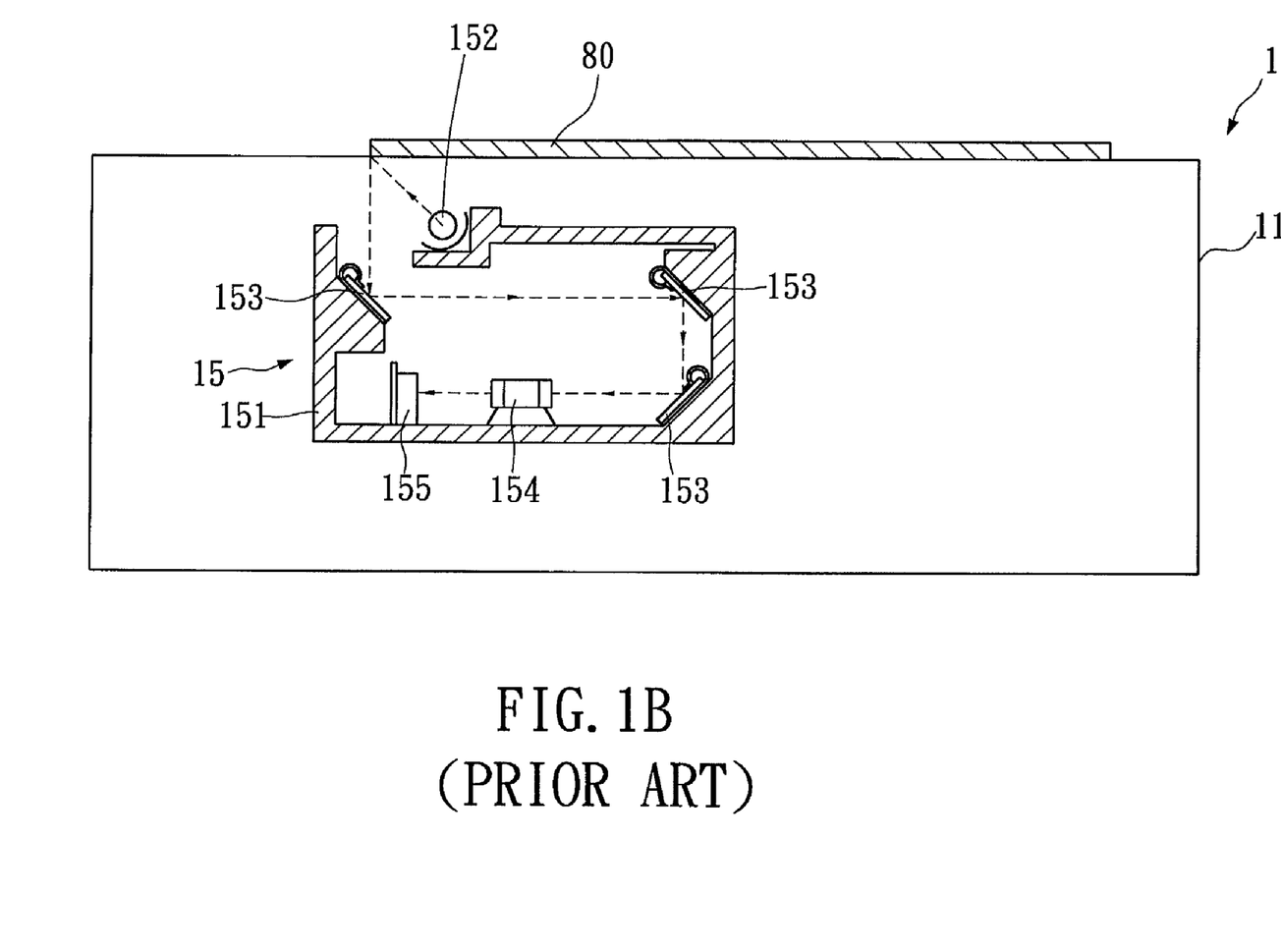
FIG. 1B is a cross-sectional illustration for a side view of a flat-typed scanner of the prior arts.

Please refer to FIG. 1A and FIG. 1B, which are structure illustrations for the flatbed scanner used in prior arts. There is mainly a document window glass 12 arranged at the upper surface of the outer shell 11 of an optical scanner for placing an object to be scanned 80. A power source set 13 connected to a transmission mechanism 14 is arranged in the outer shell 11. The power source set 13 is made to output power through the transmission mechanism 14. The power is transferred to an optical chassis 15 that proceeds a linear motion along the direction of a guiding rod 16 in the hollow outer shell 11 for executing the image scanning job on the object to be scanned 80 that is placed upon the document window glass 12. The optical chassis 15 has a hollow shell body 151, a light source 152 located at an appropriate position of the upper side surface of the shell body 151, a plurality of reflective mirrors 153, a lens set 154 and a charge-coupled device (CCD) 155. The light emitted from the light source 152 is incident upon the object to be scanned 80. After the reflective light enters the shell body 151, and after it is reflected and direction-changed to increase its optical length to an appropriate length by a plurality of reflective mirrors 153, it becomes an image on the charge-coupled device 155 through the focusing of the lens set 154. The charge-coupled device 155 then converts the scanned image data into treatable electronic signals.

Figure 2A:
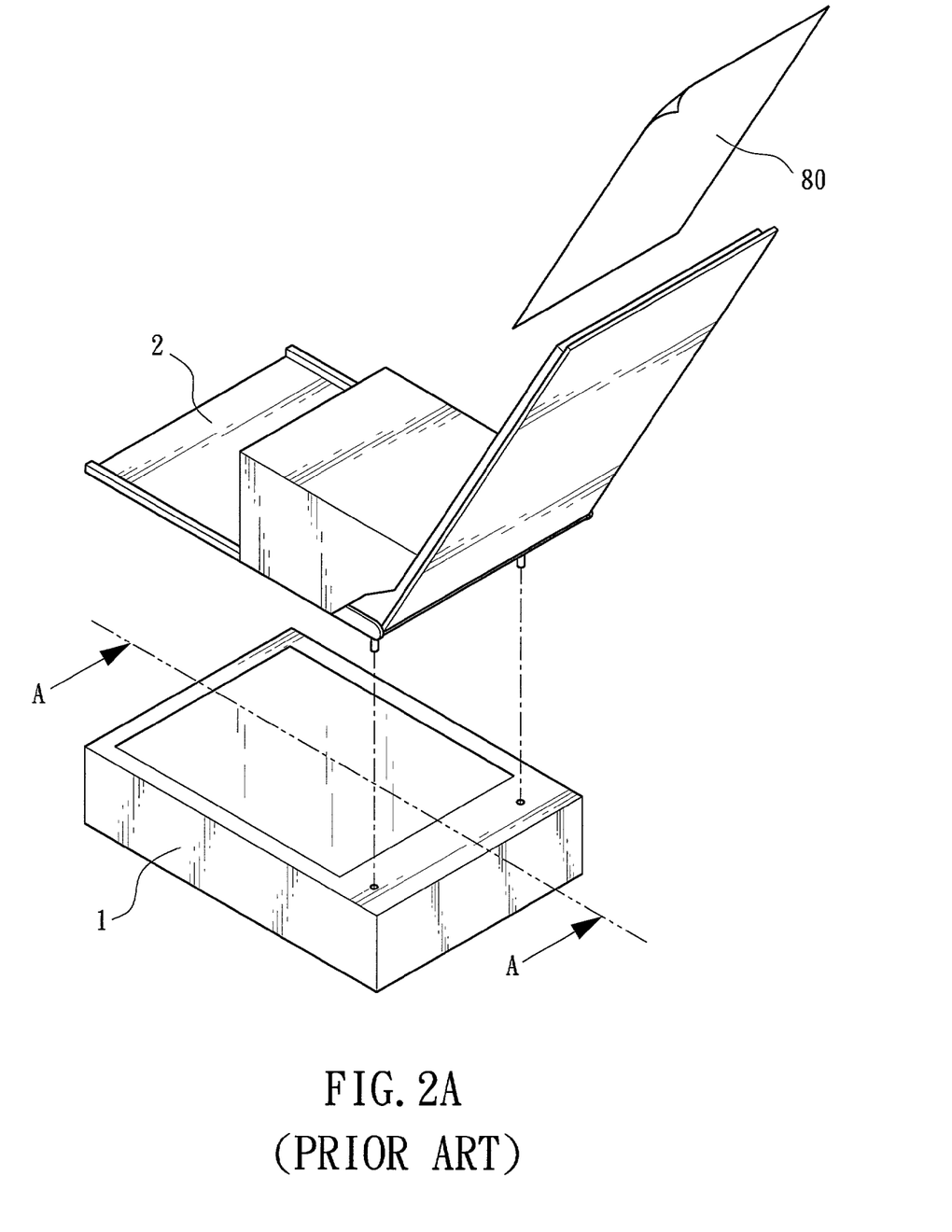
FIG. 2A is a three-dimensional structure illustration for an automatic document feeder for scanner carried in a flatbed-typed scanner of the prior arts.
Figure 2B:
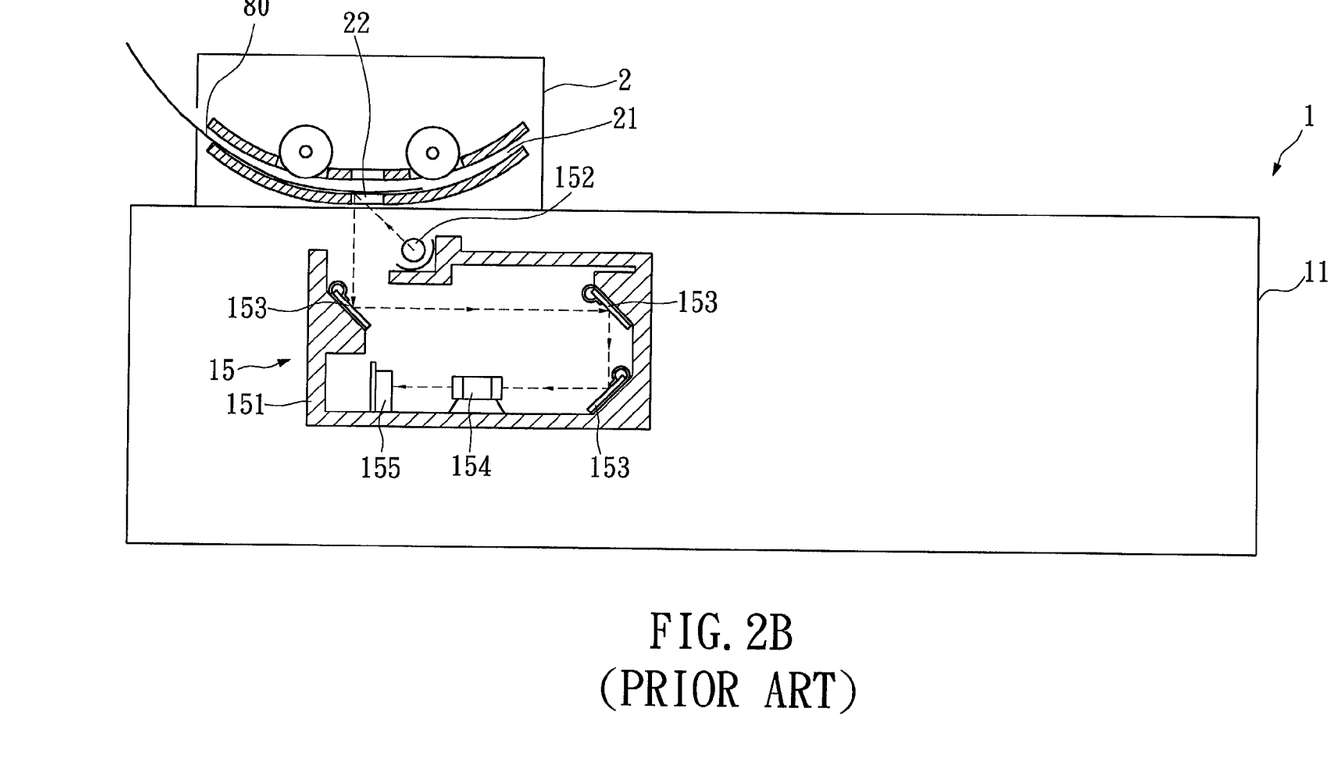
FIG. 2B is a cross-sectional structure illustration for a side view for an automatic document feeder for scanner carried in a flatbed-typed scanner of the prior arts.

Please refer to FIG. 2A and FIG. 2B, which are illustrations for an automatic document feeder provided in a flatbed scanner of the prior arts. When the flatbed scanner proceeds document-feeding-typed scanning, and after the flatbed scanner 1 carries an automatic document feeder 2 and moves the optical chassis 15 to the scanning zone of the automatic document feeder 2, the optical chassis 15 is fixed. The automatic document feeder 2 is arranged a guiding groove 21. A scanning window 22 provided at an appropriate position of the guiding groove 21 may provide the optical chassis 15 to proceed image picking-up on the object to be scanned 80 that passes through the guiding groove 21. An image is generated by applying the light source 152 to the object to be scanned 80 through the processes of reflection or penetration. After the reflective light enters the shell body 151, and after it is reflected and direction-changed to increase its optical length to an appropriate length by a plurality of reflective mirrors 153, it becomes an image on the charge-coupled device 155 through the focusing of the lens set 154. The charge-coupled device 155 then converts the scanned image data into treatable electronic signals.

Figure 3A:
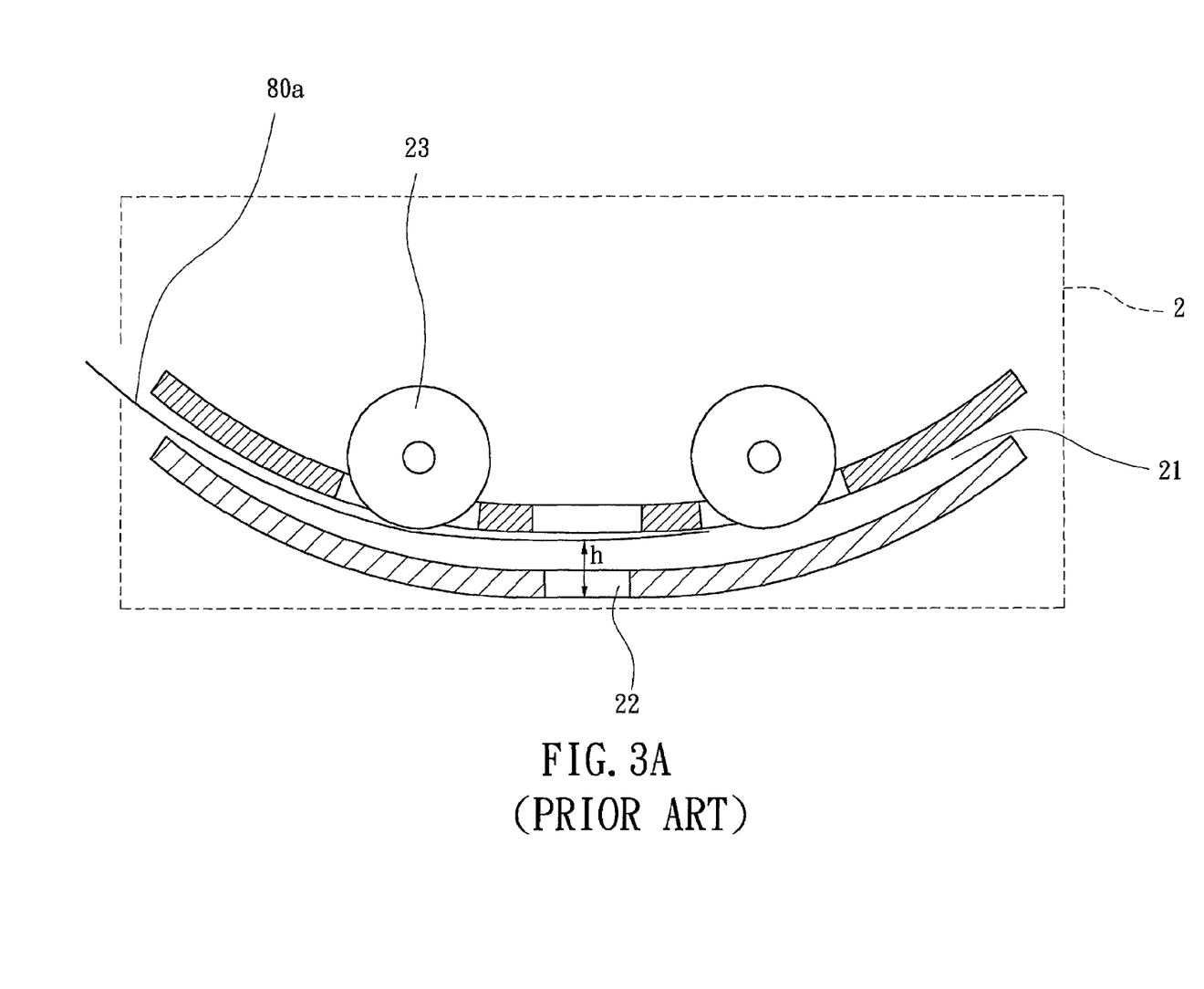
FIG. 3A is a cross-sectional illustration for a side view for a thinner object to be scanned that is fed by an automatic document feeder of the prior arts.
Figure 3B:
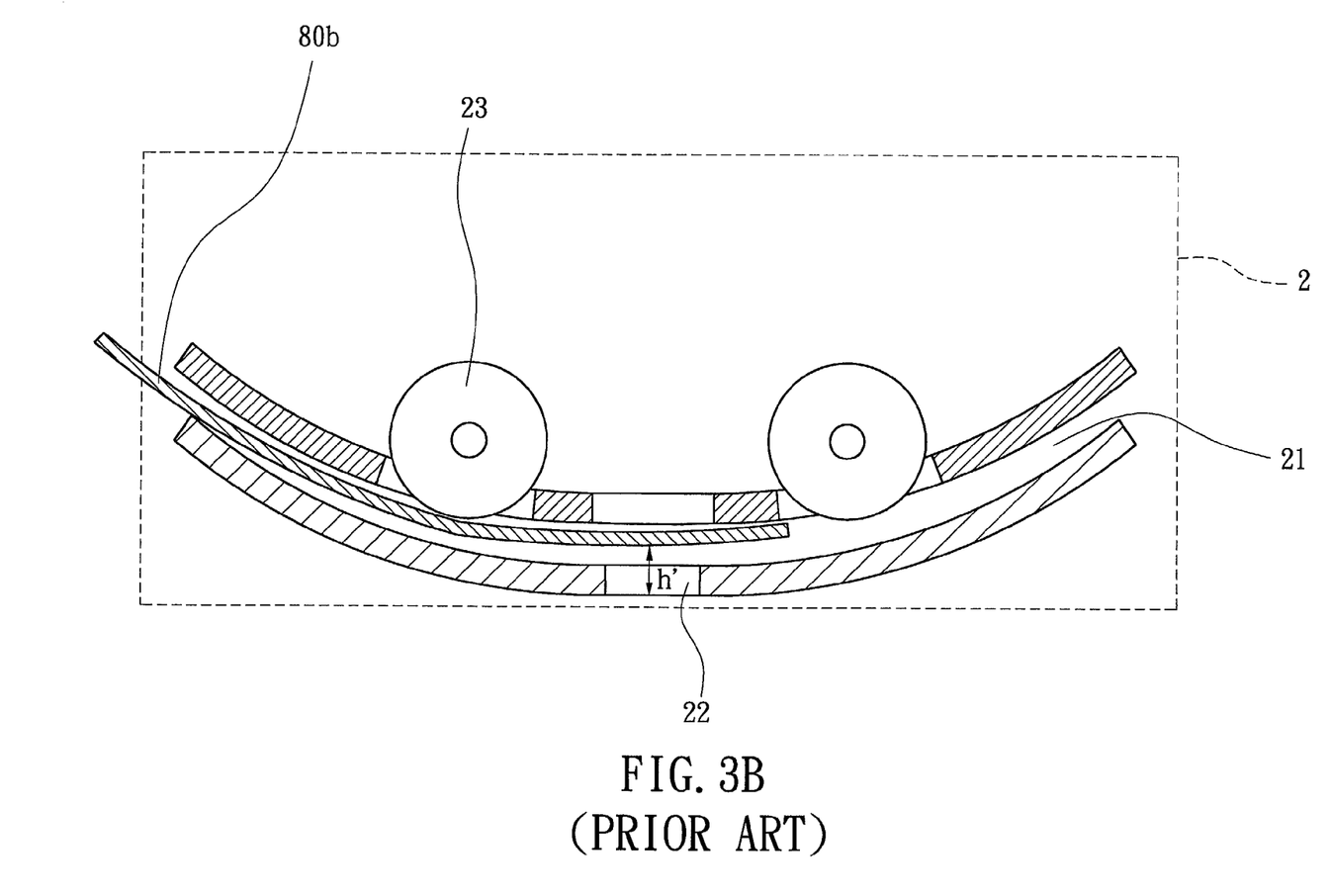
FIG. 3B is a cross-sectional illustration for a side view for a thicker object to be scanned that is fed by an automatic document feeder of the prior arts.

Please refer to FIG. 3A and FIG. 3B, which are the cross-sectional illustrations for the side view for the object to be scanned that is fed by the automatic document feeder of the prior arts. The guiding groove 21 arranged by the automatic document feeder 2 has an appropriate accommodation space for providing the pass for the object to be canned that has different thickness. When a feeding roller 23 feeds the thinner object to be scanned 80a to the scanning window 22, the thinner object to be scanned 80a is kept a depth of field height h with the scanning window 22. The depth of field height h is longer than the depth of field height h' of the fed thicker object to be scanned 80b. Therefore, it causes an error of optical length for the optical chassis (not shown in the drawings) to pick up the image for the object to be scanned 80. So, sometimes the image of the object to be scanned 80 formed on the charge-coupled device (not shown in the drawings) is clear, and sometimes the scanned out image is vague. In order to use a more convenient way in automatic document-feeding-typed scanning, the consumers only have to accept the image clearness of the object to be scanned 80 in an appropriate degree. Therefore, for the businessmen engaged in the relative fields of scanner, they devote all their efforts to the research of perfect methods for solving this kind of problem to enhance the industrial competition abilities.

SUMMARY OF THE INVENTION

The main object of the present invention is to provide a depth of field adjustment device and method for an automatic document feeder, which makes a further clear image picking up for an object to be scanned that is provided by an automatic document feeder to achieve an optimal image formed on the charge-coupled device.

The secondary object of the present invention is to provide a depth of field adjustment device and method for an automatic document feeder, which adjusts the depth of field of an automatic document feeder to achieve the adaptation function for different kinds of document quality.

In order to achieve above objects, there is provided a depth of field adjustment device for an automatic document feeder of the present invention. Wherein the automatic document feeder having a guiding groove, the guiding groove having a scanning window at an appropriate position. The scanning window is provided an optical chassis to proceed an image picking up on an object to be scanned that passes through the guiding groove. The depth of field adjustment device for an automatic document-feeder is comprised an adjustable suppressing mechanism.

The adjustable suppressing mechanism is capable of corresponding to the scanning window at an appropriate position of the guiding groove. The located height of the object to be scanned that passes through the scanning window adjusted by the adjustable suppressing mechanism.

In the embodiments of the depth of field adjustment method for an automatic document feeder of the present invention, comprising the steps of:

Step A: provide an automatic document feeder, which has a guiding groove for placing an object to be scanned. The guiding groove had a scanning window for providing an image picking up proceeded by an optical chassis. An adjustable suppressing mechanism located in corresponding to the scanning window on the guiding groove may adjust and change a depth of field height of the object to be scanned that passes through the scanning window.

Step B: feed in a pre-scanned object to be located between the adjustable mechanism and the scanning window.

Step C: adjust and change the depth of field height by the adjustable suppressing mechanism.

Step D: the optical chassis proceeds image picking up on the pre-scanned object.

Step E: compare the image of the pre-scanned object with a pre-stored image to judge whether the depth of field height is optimal or not.

Step F: when the judgment is an optimal depth of field height, then the adjustable suppressing mechanism is fixed. If the judgment is not an optimal depth of field height, then the Step C through Step E are repeated.

For your esteemed reviewing committee to further understand and recognize the objects, functions and characteristics of the present invention, a detailed description in company with corresponding drawings are present as following.

DETAILED DESCRIPTION OF THE INVENTION

The main characteristic of the present invention is that the depth of field adjustment device for an automatic document feeder is provided an adjustable suppressing mechanism located at an appropriate position of the guiding groove in corresponding to the scanning window, and a depth of field height of the object to be scanned that passes through the scanning window may be adjusted by the adjustable suppressing device.

Figure 4A:
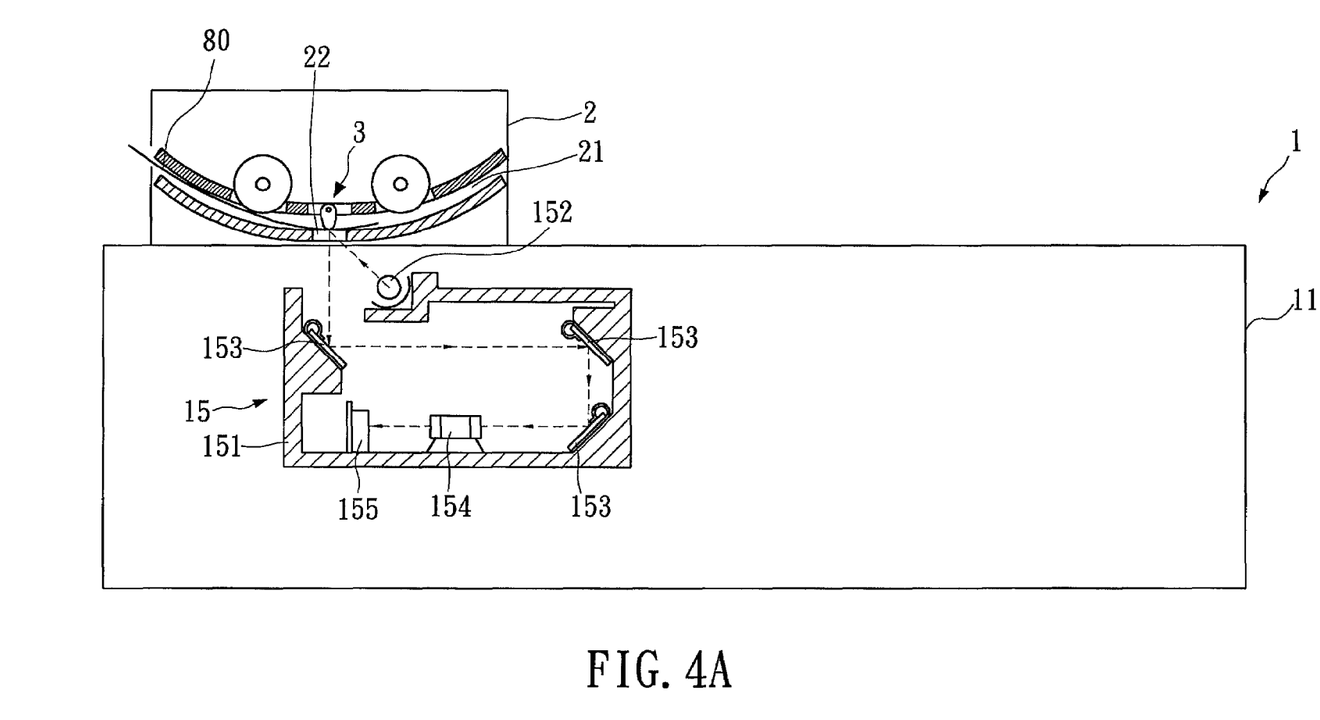
FIG. 4A is an implementing illustration for the preferable position of the depth of field adjustment device of an automatic document feeder carried by the flatbed-typed scanner of the present invention.
Figure 4B:
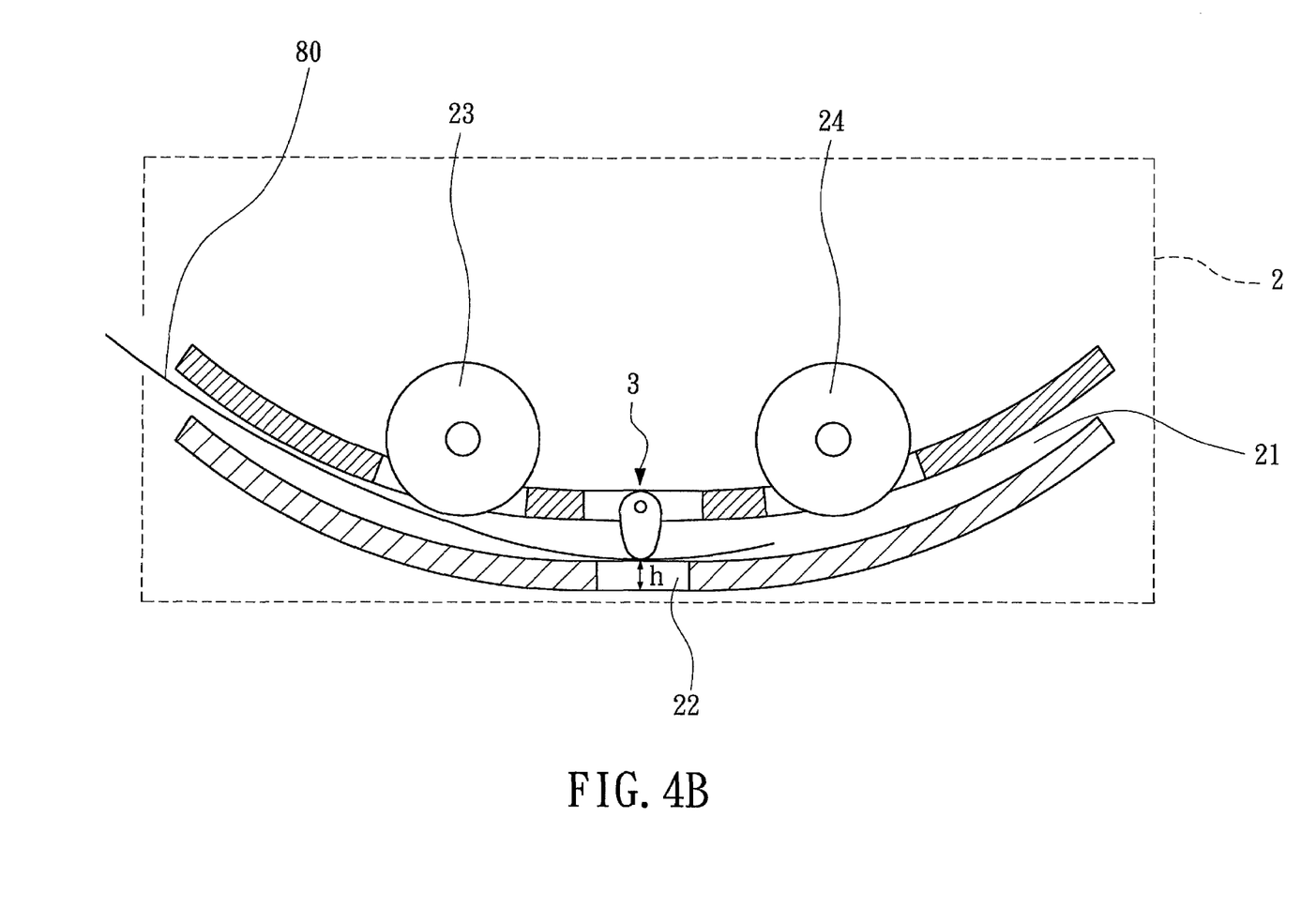
FIG. 4B is an implementing illustration for the preferable position of the depth of field adjustment device of an automatic document feeder of the present invention.

Please refer to FIG. 4A and FIG. 4B, which are the illustrations for the preferable position embodiment of the depth of field adjustment device for an automatic document feeder of the present invention. Wherein, when the flatbed-typed scanner proceeds the document-feeding-typed scanning, the flatbed-typed scanner carries an automatic document feeder 2 and then an optical chassis 15 is moved to the scanning zone of the automatic document feeder 2 and fixed afterwards. The automatic document feeder 2 has a guiding groove 21. A scanning window 22 is provided at an appropriate position of the guiding groove 21. An adjustable suppressing mechanism 3 is provided at an appropriate position of the guiding groove 21 in corresponding to the scanning window 22. When an object to be scanned is placed in, the guiding groove 21 is provided a feeding roller 23 for feeding the object 80 to be scanned. When the object to be scanned 80 is along the guiding groove 21 and located under the scanning window 22, a depth of field height h of the object to be scanned that passes through the scanning window is adjusted by the adjustable suppressing mechanism 3. Afterwards, the optical chassis 15 is provided the light source 152 that is incident upon the object 80 to be scanned and an image is generated through reflection and penetration. After the reflective light enters the shell body 151 of the optical chassis 15, and after it is reflected and direction-changed to increase its optical length to an appropriate length by a plurality of reflective mirrors 15D, the image is formed on the charge-coupled device 155 through the focusing of the lens set 154, and the scanned image data is then converted into electronic signals. The object to be scanned 80 is again sent out by a sending-out roller 24 and released from the guiding groove 21.

Please refer to FIG. 5A through FIG. 5D, which are the structural illustrations for side view of the preferable embodiments of the depth of field adjustment device for an automatic document feeder of the present invention. Wherein, the adjustable suppressing mechanism 3 includes a power source 31, a transmission unit 32 and an adjustment unit 33. Wherein, in the preferable embodiments of the present invention shown in FIG. 5A and FIG. 5B, the power source 31 includes a motor 311 capable of providing a power output. In the same time, the motor 311 may provide the power needed by the sending-out roller 24. So the transmission unit 32 is driven together with the sending-out roller 24. The design of the transmission unit 32 includes a transmission belt 321 for appropriately transferring the power. The adjustment unit 33 matched with the transmission belt 321 is designed as a cam 331 or an eccentric wheel 332. The transmission belt 321 through the transfer of the power source 31 outputs the power for driving the cam 331 or the eccentric wheel 332 to generate rotary displacement variation to become different angle positions corresponding to various lengths for changing the depth of field height h. Therefore, the transmission unit 32 connected with the adjustment unit 33 drives and changes its displacement motion to be able to adjust the depth of field height h of the object to be scanned that passes through the scanning window 22.

Figure 5A:
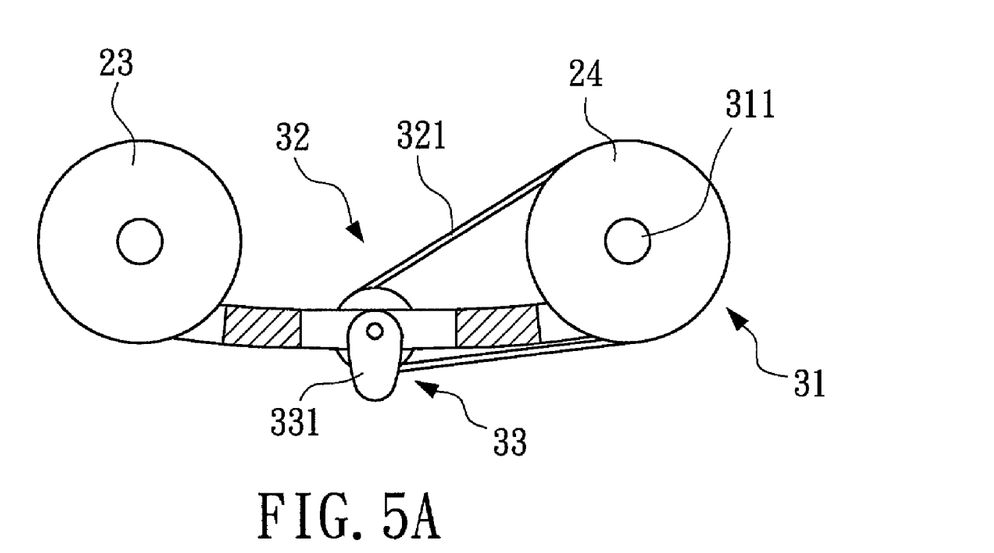
FIG. 5A is a structural illustration for a side view of the first preferable embodiment of the depth of field adjustment device for an automatic document feeder of the present invention.
Figure 5B:
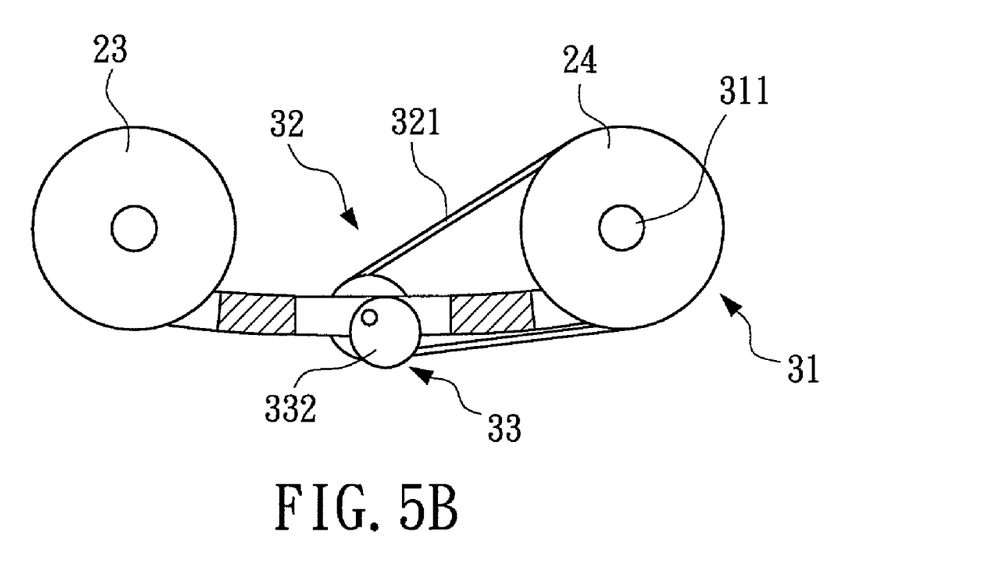
FIG. 5B is a structural illustration for a side view of the second preferable embodiment of the depth of field adjustment device for an automatic document feeder of the present invention.
Figure 5C:
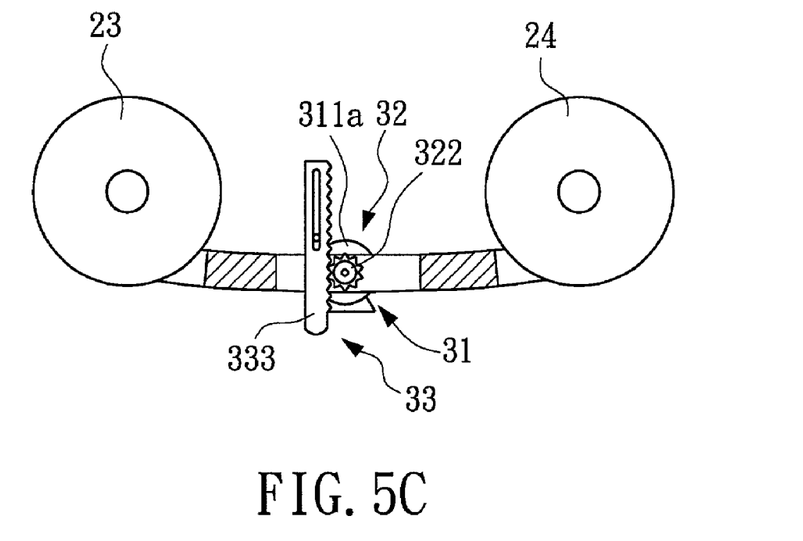
FIG. 5C is a structural illustration for a side view of the third preferable embodiment of the depth of field adjustment device for an automatic document feeder of the present invention.
Figure 5D:
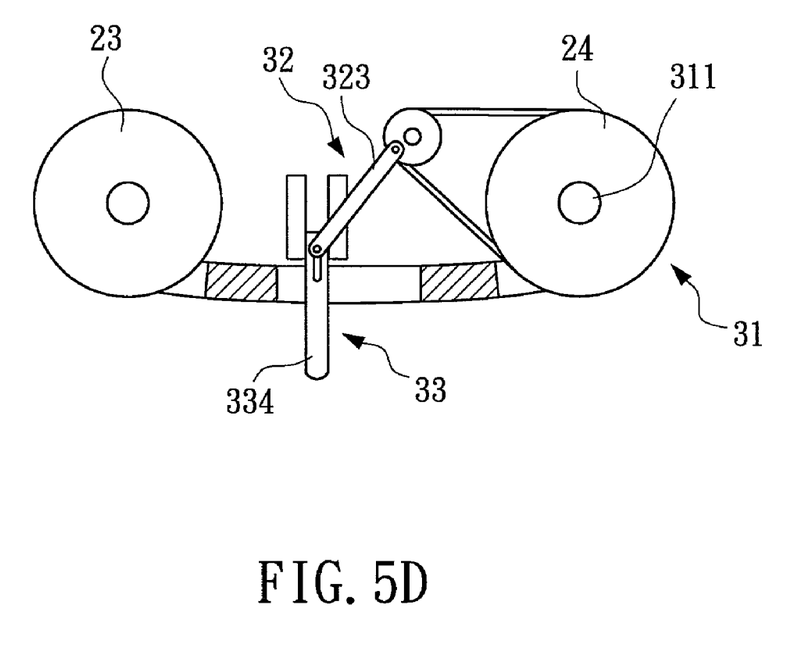
FIG. 5D is a structural illustration for a side view of the fourth preferable embodiment of the depth of field adjustment device for an automatic document feeder of the present invention.

Of course, in another preferable embodiment of the present invention shown in FIG. 5C, the power source 31 is a motor 311 a singly providing the power, and preferably it may provide positive and reverse dual rotations. This is different from the above-mentioned embodiments that are driven together by the sending-out roller 24. The transmission unit includes a gear set 322. The adjustment unit 33 matched with the gear set 322 is designed as a rack 333. The gear set 322 may output the power transferred from the power source 31 to be able to drive the rack 333 to generate linear displacement motion for changing the depth of field height h. In further another preferable embodiment of the present invention shown in FIG. 5D, the transmission unit 32 includes a connection rod set 323. The adjustment unit 33 matched with the connection rod set 323 is designed as a gliding block 334. The connection rod set 323 may output the power transferred from the power source 31 to change the rotary displacement into linear displacement motion of the gliding block 334 for changing the depth of field height h. Of course, the above adjustment unit 33 all may be interchanged with the transmission unit 32. Such kind of structural variation may be understood and implemented from above-mentioned description, so they are not repetitiously described herein any more.

Figure 6:
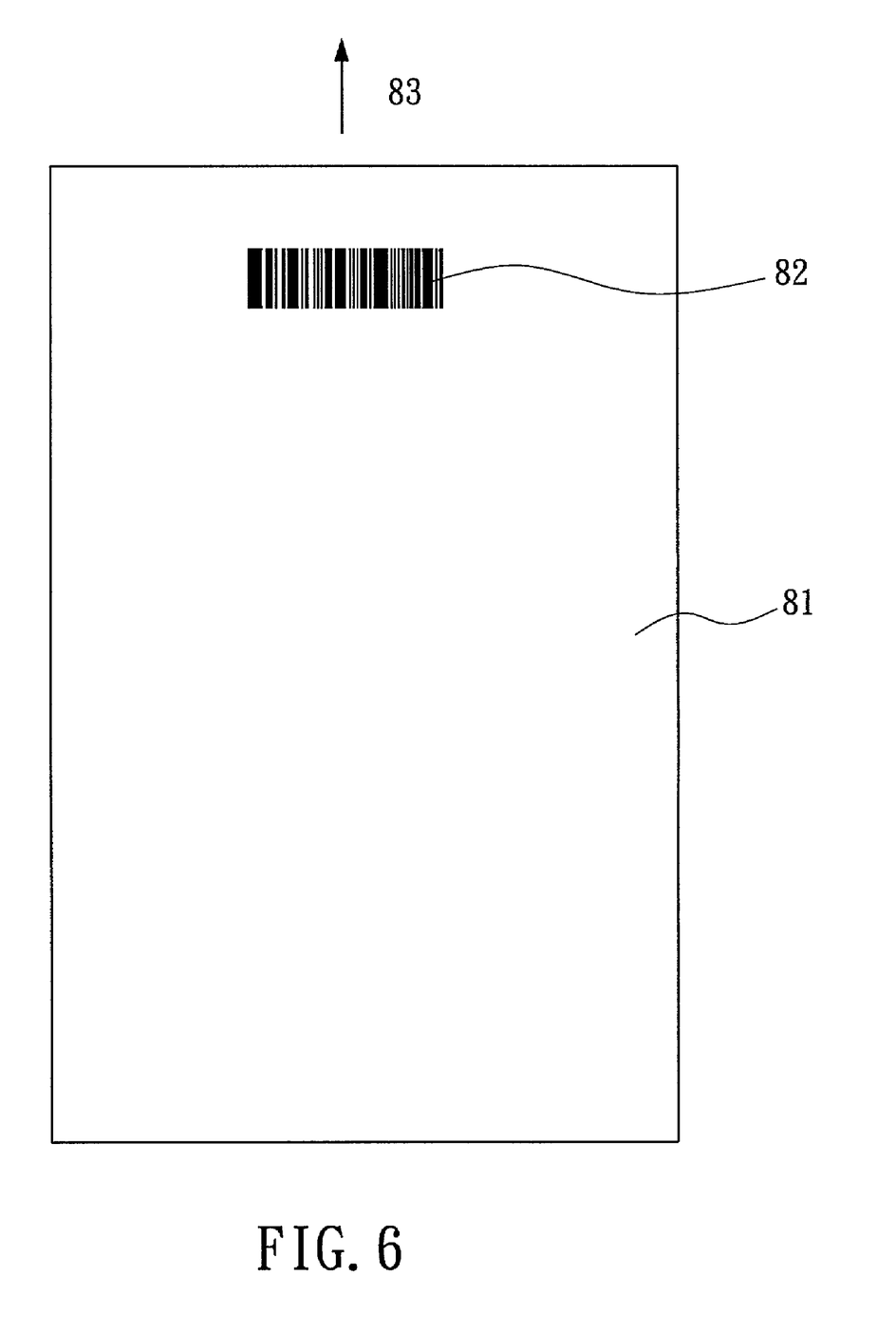
FIG. 6 is an illustration for the preferable embodiment of the object to be scanned of the present invention.

When the scanning is executed, the thickness of the fed object to be scanned will influence the depth of field height to cause error for the optical length of the image picked up by the optical chassis 15 on the object 80 to be scanned. Therefore, before the scanning, a pre-scanned object 81 with the same thickness as the object 80 to be scanned will be placed in first for providing the necessary detection. Afterwards, the adjustable suppressing mechanism 3 is fixed, and the scanning on the object 80 to be scanned is then executed. Please refer to the FIG. 6, which is the illustration for the preferable embodiment of the object to be scanned of the present invention. Wherein, the pre-scanned object 81 is a correction manuscript that is arranged a pattern 82 capable of providing picking-up judgment. The pattern 82 is a black and white inter-spaced stripes pattern and may be designed in parallel or perpendicular with the feeding direction 83. Of course, the pattern 82 is preferably arranged at the front central part of the fed pre-scanned object 81. Other position variation as long as it may provide the optical chassis (not shown in the drawings) for picking up the image of the pattern 82 is still within the merits of the present invention and also not departed from the spirit and scope of the present invention.

Figure 7:
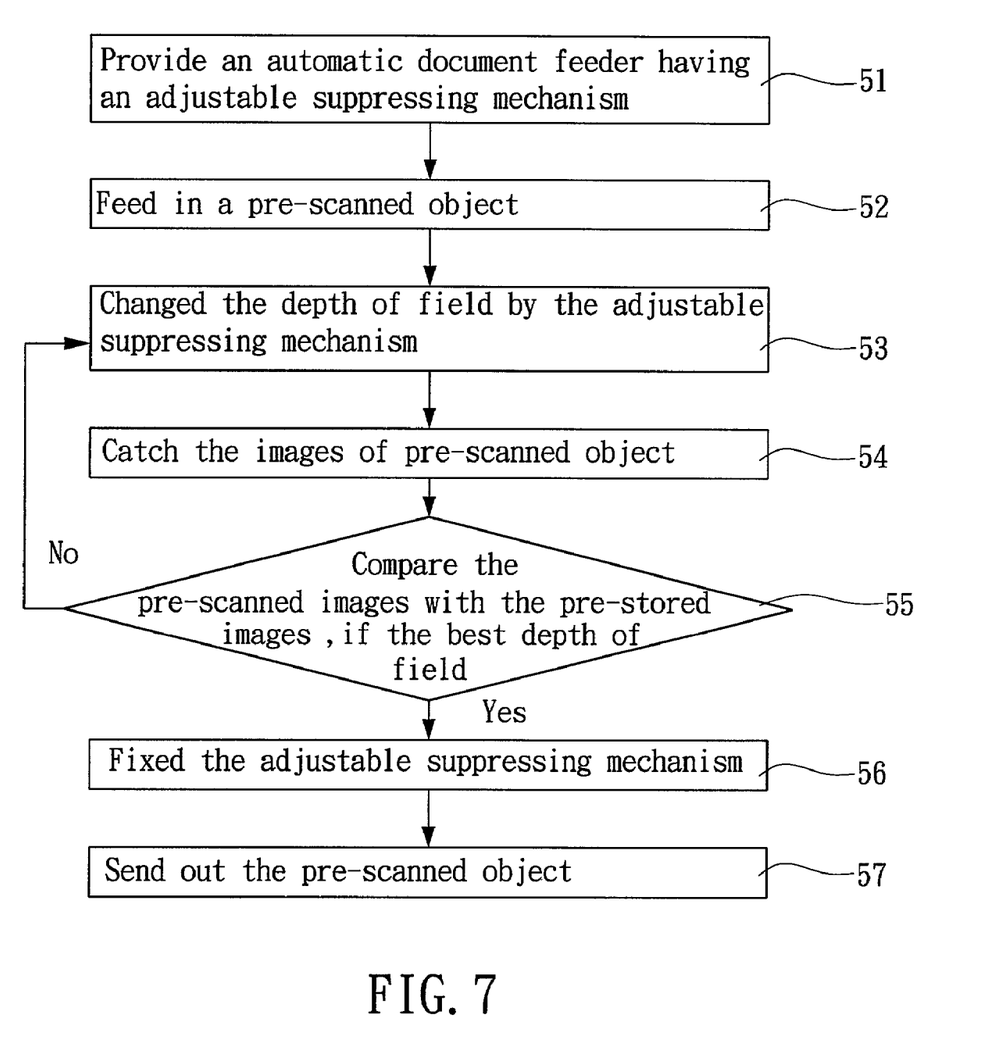
FIG. 7 is an illustration of flow chart for the preferable embodiment of the depth of field adjustment method for an automatic document feeder of the present invention.

Please refer to FIG. 7, which is a flow chart illustration for the preferable embodiment of the depth of field adjustment method for an automatic document feeder of the present invention. The preferable embodiment of the depth of field adjustment method for an automatic document feeder of the present invention, comprising the steps of:

Step A: provide an automatic document feeder that had an adjustable suppressing mechanism (51). The automatic document feeder has a guiding groove that is provided a scanning window for the optical chassis to proceed image picking-up. And, the adjustable suppressing mechanism is located on the guiding groove that is in corresponding to the scanning window.

Step B: during the execution of scanning, because the thickness of the object to be scanned will cause error for the optical length picked up by the optical chassis from the object to be scanned, before the execution of scanning, a pre-scanned object with the same thickness of the object to be scanned will be fed in by a feeding roller provided by the guiding groove (52). The pre-scanned object is fed in along the guiding groove and located at the position between the scanning window and the adjustable suppressing mechanism. Wherein, the pre-scanned object is a correction manuscript that is arranged a black and white inter-spaced stripes pattern capable of providing picking-up judgment.

Step C: the depth of field height of the pre-scanned object passing through the scanning window may be adjusted and changed by the adjustable suppressing mechanism (53).

Step D: the optical chassis proceeds the image picking-up of the pre-scanned object with the depth of field height (54). Wherein, the optical chassis preferably proceeds the image picking-up of the pre-scanned object that is arranged with the pattern. Afterwards, the image of the pre-scanned object scanned and treated by the optical chassis is converted into electronic signals and then stored.

Step E: compare the image of the pre-scanned object with pre-stored images (55). It may decide an optimal depth of field height by choosing a pre-stored object image data that is most similar to the image of above pre-scanned object.

Step F: adjust the adjustable suppressing mechanism for getting the optimal depth of field height of the pre-scanned object passing through the scanning window (56), and the adjustable suppressing mechanism is fixed. If the judgment is not the position for optimal depth of field height, then the Step C through Step E are repeated.

In the depth of field adjustment method for automatic document-feeder of the present invention, the preferable embodiment of the adjustable suppressing mechanism further includes:

Step G: the object to be scanned is rotated out and released from the guiding groove to send out the pre-scanned object by a sending-out roller arranged at the guiding groove (57). Afterwards, a scanning job is executed on the object to be scanned that has the same thickness.

From above-described depth of field adjustment device and method for an automatic document feeder of the present invention, we can realize that it may really adjust the depth of field of the automatic document feeder to achieve the function of adaptation for various document qualities. And, it may make further clear image picking-up for the document manuscript provided by the automatic document feeder to achieve the optimal image clearness formed on the charge-coupled device. Therefore, the present invention may provide a perfect solution to promote industrial competition abilities to the enterprises that are engaged in the relative field of scanner.

What is claimed is:

1. A depth of field adjustment device for an automatic document feeder, the automatic document feeder having a guiding groove, the guiding groove having a scanning window at an appropriate position, the scanning window to allow an optical chassis to obtain an image of an object to be scanned that passes through the guiding groove, said depth of field adjustment device comprising:

an adjustable suppressing mechanism, said adjustable suppressing mechanism corresponding to the scanning window at an appropriate position of the guiding groove, wherein a depth of field height of the object to be scanned that passes by the scanning window is adjustable by the adjustable suppressing mechanism.

2. The depth of field adjustment device for an automatic document feeder of claim 1, wherein the adjustable suppressing mechanism, comprising:

a power source is provided a power output;

a transmission unit, is capable of connecting to the power source, and the power is transmitted appropriately by the transmission unit; and an adjustment unit, is capable of connecting to the transmission unit, and the depth of field height of the object to be scanned that passes through the scanning window adjusted by the displacement motion of the adjustment unit.

3. The depth of field adjustment device for an automatic document feeder of claim 2, wherein the power source has a motor.

4. The depth of field adjustment device for an automatic document feeder of claim 2, wherein the transmission unit has a transmission belt.

5. The depth of field adjustment device for an automatic document feeder of claim 2, wherein the transmission unit has a gear set.

6. The depth of field adjustment device for an automatic document feeder of claim 2, wherein the transmission unit has a connection rod set.

7. The depth of field adjustment device for an automatic document feeder of claim 2, wherein the adjustment unit is a cam.

8. The depth of field adjustment device for an automatic document feeder of claim 2, wherein the adjustment unit is an eccentric wheel.

9. The depth of field adjustment device for an automatic document feeder of claim 2, wherein the adjustment unit is a rack.

10. The depth of field adjustment device for an automatic document feeder of claim 2, wherein the adjustment unit is a gliding block.

11. A depth of field adjustment method for an automatic document feeder, comprising:

feeding in a pre-scanned object to be located between an adjustable suppressing mechanism and a scanning window;

adjusting a depth of field height by the adjustable suppressing mechanism;

obtaining an image of the pre-scanned object;

comparing the image of the pre-scanned object with a pre-stored image to decide a desired depth of field height;

setting the adjustable suppressing mechanism at the desired depth of field height.

12. The depth of field adjustment method for an automatic document feeder of claim 11, wherein the pre-scanned object is a correction document that includes a pattern for image picking-up judgment.

13. The depth of field adjustment method for an automatic document feeder of claim 12, wherein the pattern is a black and white inter-spaced stripes pattern.

14. The depth of field adjustment method for an automatic document feeder of claim 12, said obtaining includes image picking-up on the object to be scanned that includes the pattern.

15. The depth of field adjustment method for an automatic document-feeder of claim 11, further comprising:

sending out the object to be scanned.

* * * * *